Patented Oct. 14, 1947

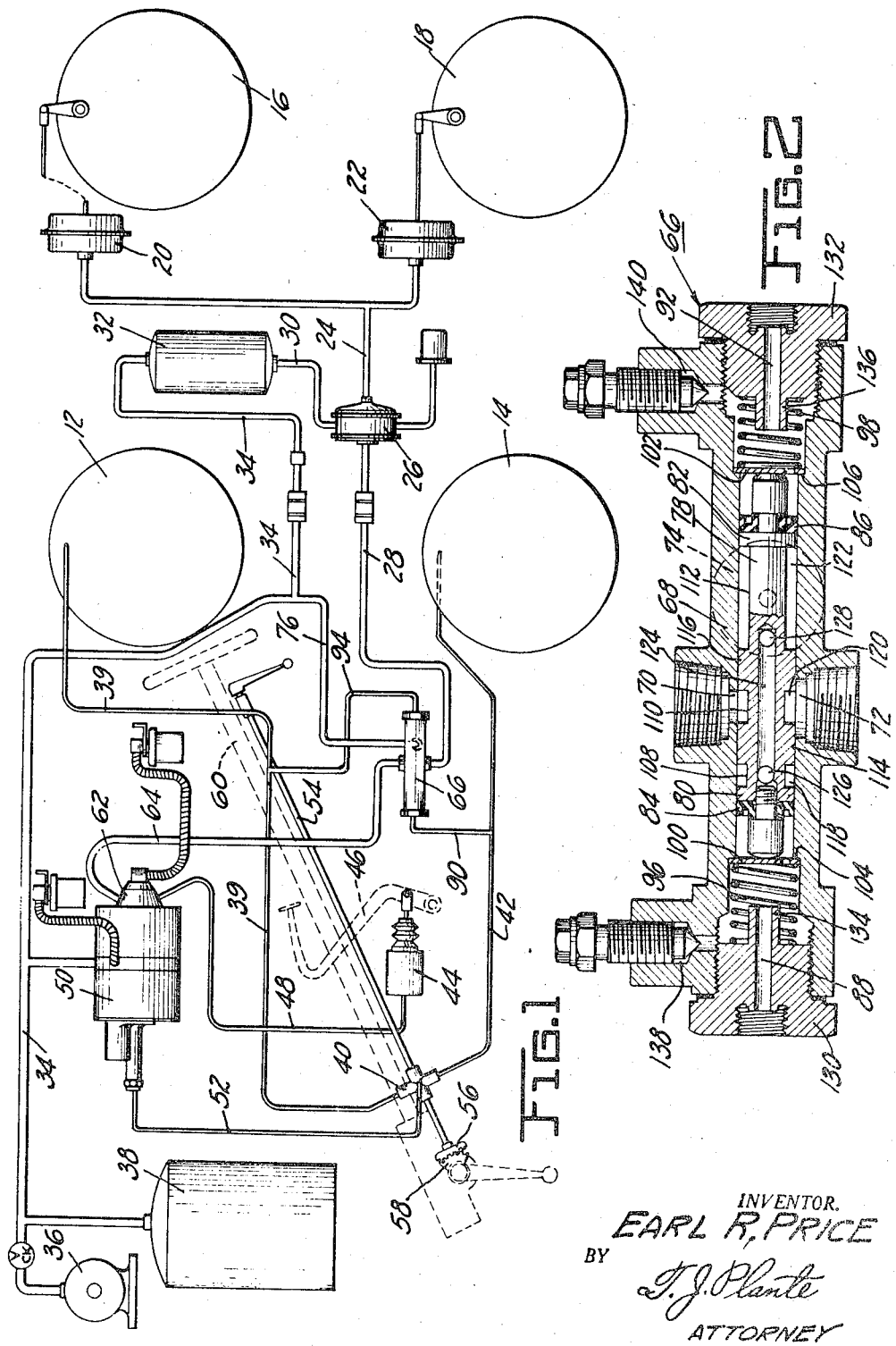

2,429,197

UNITED STATES PATENT OFFICE 2,429,197

TRAILER SHUTOFF VALVE

Earl R. Price, South Bend, Ind., assignor to Bendix Aviation Corporation, South Bend, Ind., a corporation of Delaware Application January 26, 1946, Serial No. 643,587

4 Claims. (Cl. 188—3)

This invention relates to tractor-trailer controls, in which brakes are provided on both the tractor and the trailer and the entire braking system is capable of being put into operation by a single control member.

In certain types of earth-moving equipment, it is customary to use a tractor-trailer combination in which the controls are located on the tractor while the actual working equipment is provided on the trailer. Most of these tractor-trailer combinations are heavy and difficult to maneuver, and they are usually extremely hard to steer.

It is proposed to ease the steering of such tractor-trailer combinations by utilizing selective application of the tractor brakes to assist the usual steering control. This means that, if the vehicle is to be turned to the left, the brake on the left wheel of the tractor is actuated, while the brake on the right wheel of the tractor is prevented from operating, thereby permitting the right wheel to turn freely while the left wheel acts as a pivot. On the other hand, if the vehicle is to be turned toward the right, the brake on the right wheel is applied but the left wheel brake is prevented from applying.

If brakes are provided for the trailer, it is customary that the operation of these brakes be synchronized with the operation of the tractor brakes. In other words, the operator of the tractor, by manipulation of the foot pedal or the like, is able to cause operation of the trailer as well as the tractor brakes.

The primary object of the present invention is to provide means for preventing the trailer brakes from operating whenever the tractor brakes are being used for steering purposes, while permitting the trailer brakes to operate synchronously with the tractor brakes whenever the purpose is to slow or stop the tractor-trailer combination.

Stated another way, the object of the present invention is to provide a shut-off valve for the trailer brakes which will normally connect said brakes to the usual control line, but which will automatically shut off the trailer brakes whenever the tractor brakes are being used for steering purposes.

Further objects and advantages of the present invention will become apparent during the course of the following description. In the drawings:

Figure 1 is a diagrammatic showing of the brake control system of a tractor-trailer vehicle combination; and Figure 2 is a sectional view of the trailer shut-off valve of Fig. 1.

Referring to the drawings, the numeral 12 indicates a diagrammatic showing of a brake on the right side of the tractor, and the numeral 14 indicates a diagrammatic showing of a brake on the left side of the tractor. Trailer brakes 16 and 18 are shown diagrammatically, and are adapted to be actuated by means of the conventional power cylinders 20 and 22 which are connected by means of a common conduit 24 to the usual relay valve 26. The relay valve 26 is operated according to pressure changes in the control line 28. One side of each trailer power cylinder is continuously open to air at atmospheric pressure. A vacuum line 30 connects one port of relay valve 26 with the vacuum reservoir 32 of the trailer, which is in turn connected by means of a conduit 34 with the source of vacuum on the tractor. This source of vacuum may consist of a vacuum pump 36, and a vacuum reservoir 38 may be provided on the tractor.

The right hand brake 12 of the tractor is connected by means of a hydraulic line 39 to a selector valve 40 and the left hand brake 14 of the tractor is connected by means of the hydraulic line 42 to the selector valve 40. A conventional master cylinder 44 controlled by the usual pedal 46 is arranged to displace liquid through line 48 to cause application of the brakes. In the illustrated arrangement, a power device 50 is utilized to assist the manual effort of the operator in building up hydraulic pressure at the brakes 12 and 14. The power assistor 50 is caused to operate by the pressure developed in line 48 and it in turn causes the displacement of liquid under pressure through line 52 to selector valve 40.

Operation of selector valve 40 is under the control of the steering apparatus of the tractor, the rod 54 having a gear 56 mounted thereon which meshes with a sector 58 controlled by turning the steering column 60. The arrangement of selector valve 40 is such that it causes one or the other of the tractor brakes to be shut off, i. e., disconnected from line 52, if the steering column 60 is turned more than a predetermined amount from central or straight-ahead position. Thus, if pressure is developed in master cylinder 44 and consequently in power device 50 at a time when one of the brakes is cut off by selector valve 40, the brake pressure will assist in steering the vehicle because the tractor will tend to pivot on the wheel which is being braked, i. e., the wheel which has not been cut off by selector valve 40.

The control valve which regulates operation of power device 50 under the influence of pressure developed in master cylinder 44, is shown in outline at 62. A pipe 64 leading from this valve constitutes the control line for the trailer brakes, i. e., when in communication with line 28 it causes the trailer brakes to be applied whenever the tractor brakes are applied.

In order to insure that the trailer brakes will not apply when the tractor brakes are being used merely for assistance in steering the vehicle, and when it is not desired to retard the tractor-trailer combination, I have provided a shutoff valve 66 for controlling operation of the trailer brakes. A sectional view of this valve is shown in Figure 2.

Referring to Figure 2, it will be seen that the casing 68 of shutoff valve 66 is provided with three ports associated with the operation of the trailer relay valve, i. e., ports 70, 72 and 74 (the latter being shown by dotted line). Port 70 is connected to pipe 64, port 72 is connected to pipe 28, and port 74 is connected to a pipe 76 which leads to vacuum pipe 34.

Reciprocable within casing 68 of the shutoff valve is a combined piston and plunger-valve member 78. The member 78 is provided with a pressure responsive piston head 80 at one end and a second pressure responsive piston head 82 at the other end, suitable sealing members 84 and 86 being provided at said piston heads. At the left end of the valve casing is a port 88 which connects with a conduit 90 leading to hydraulic line 42. At the right end of the shutoff valve is a port 92 which connects with a conduit 94 leading to the hydraulic line 38.

Piston 78 is normally retained in its central position by means of springs 96 and 98 which ordinarily retain perforated positioning members 100 and 102 against shoulders 104 and 106 provided at opposite ends of the valve casing. Thus the positioning members 100 and 102 are normally held against the respective shoulders and the members 78 is centralized between them. However, the yieldability of springs 96 and 98 permits the piston member 78 to move in either direction if a sufficient differential develops between the pressures prevailing at opposite ends thereof.

Between the end faces 80 and 82 of piston member 78 are three reduced diameter portions of the piston, namely portions 108, 110, and 112. The provision of lands 114 and 116 thus provides annular chambers 118, 120 and 122. Chambers 118 and 122 are permanently interconnected by means of a longitudinal passage 124 and lateral passages 126 and 128 formed in the body of the piston member 78.

Operation of the trailer shutoff valve 66 is as follows. In the position shown in Figure 2, annular chamber 120 interconnects ports 70 and 72, thereby providing communication between pipes 64 and 28. If the tractor brakes are applied with the piston member 78 in this position, operation of valve 62 will cause operation of relay valve 26 and the trailer brakes will apply synchronously with the tractor brakes. This situation will exist when the tractor-trailer combination is moving straight ahead or is turning at an angle insufficient to cause operation of selector valve 40. In this circumstance, hydraulic pressure will be developed in both the right hand brake and the left hand brake of the tractor and therefore the same pressure will act against face 80 of piston member 78 as against face 82. The opposing forces will therefore neutralize one another and the piston member 78 will remain in its central position.

If the tractor brakes are to be utilized to assist in steering, and the only tractor brake which is applied is the right hand brake, then hydraulic pressure will be built up at the right end of piston member 78 but not at the left end thereof, and therefore spring 96 will be compressed and piston member 78 will move toward the left. When member 78 has moved a sufficient distance, port 70 will be closed. However, because port 72 is wider than port 70, it will remain open and will come into communication with chamber 122 and thence with port 74 and pipe 76. The relay valve 26 will therefore communicate with the vacuum source and it will remain in an inactive or released position. It has been mentioned above that pipe 64 is maintained under vacuum so long as the brakes of the tractor and trailer are released. Therefore, connecting the relay valve 26 directly to the vacuum source, whenever it is desired to prevent the trailer brakes from operating, will insure that said trailer brakes remain inactive. The reason for connecting the trailer relay valve to the vacuum source after said relay valve has been cut off from line 64 is to prevent possible leakage in shutoff valve 66 from permitting a gradual application of the trailer brakes where such application is not desired because the tractor brakes are being used for steering purposes only.

If the tractor brakes are to be used for steering and the left-hand brake is to be applied while the right-hand brake is to be released, then hydraulic pressure will be developed at the left end of piston member 78 and not at the right end thereof, and consequently said piston member will move toward the right. This movement will cause port 70 to be closed and will cause port 72 to communicate through chamber 118 and passage 124 with chamber 122 and the vacuum source. Thus the result, insofar as the trailer brakes are concerned, is the same as in the preceding instance. The trailer brakes remain released while the tractor-trailer vehicle combination is being turned.

It will be noted that the plugs 130 and 132 in which the ports 88 and 92 are provided have extensions 134 and 136 which limit the endwise movement of piston member 78, thereby preventing said member from moving far enough in either direction to close port 72.

Bleed ports 138 and 140 are provided at the top of shutoff valve 66 near opposite ends thereof, the usual bleed plugs 142 and 144 being inserted in the respective bleed ports.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A tractor-trailer braking system comprising brakes on the trailer, brakes on the tractor, a contol on the tractor for causing operation of both the tractor brakes and the trailer brakes, means for causing said control to apply the brake on only one side of the tractor to assist in steering, and means for automatically disassociating the trailer brakes from said control whenever said causing means is operative.

2. For use in a tractor-trailer braking system having a pneumatic power device for applying the trailer brakes, a control line for the trailer power device, a hydraulic master cylinder on the tractor, a left wheel brake on the tractor adapted to be applied by pressure developed in the master cylinder, a right wheel brake on the tractor also adapted to be applied by pressure developed in the master cylinder, and a selector adapted to cause the master cylinder pressure either to apply both tractor brakes or to apply only a selected one of them; a trailer brake shutoff valve comprising a casing having a port connected to the trailer power device, a second port connected to the control line, and a third port connected to a pressure source corresponding to the control line pressure when the brakes are released, and a piston reciprocable in the casing having one end subjected to a pressure corresponding to that in the wheel brake on one side of the tractor and the other end subjected to a pressure corresponding to that in the wheel brake on the other side of the tractor, said piston being so ported as to interconnect the first and second ports when in its central or neutral position, but being arranged when displaced in either direction from its central position to disconnect the first port from the second port and connect it instead to the third port.

3. A control valve comprising a casing having three atmosphere ports provided in the side walls thereof, and two hydraulic ports, one at each end, a combined piston and plunger valve member reciprocable in said casing and having a head at each end acted on by the liquid entering the respective hydraulic port, and porting in said reciprocable member arranged to interconnect a certain two of the atmosphere ports when said member is in its central position, but to connect a given one of said two ports to the third atmosphere port whenever said member moves in either direction from its central position.

4. A control valve comprising a casing having three atmosphere ports provided in the side walls thereof, and two hydraulic ports, one at each end, a combined piston and plunger valve member reciprocable in said casing and having a head at each end acted on by the liquid entering the respective hydraulic port, a positioning element at each end of the said reciprocable member for locating the same in its central or neutral position, a spring between each positioning element and the respective end of the casing yieldable to permit the aforementioned reciprocable member to move from its central position in either direction while yieldably locating it normally, and porting in said reciprocable member arranged to interconnect a certain two of the atmosphere ports when said member is in its central position, but to connect a given one of said two ports to the third atmosphere port whenever said member moves in either direction from its central position.

EARL R. PRICE.